(12) United States Patent
Simonini et al.

(10) Patent No.: US 8,932,743 B2
(45) Date of Patent: Jan. 13, 2015

(54) THERMAL MANAGEMENT CONTROLS FOR A VEHICLE HAVING A RECHARGEABLE ENERGY STORAGE SYSTEM

(75) Inventors: Matthew Simonini, Milford, MI (US); Stephen L. Shen, Canton, MI (US); Matthew J. Martinchick, Farmington, MI (US); Lawrence P. Ziehr, Clarkston, MI (US); Keith D. Buford, Southfield, MI (US); Paul S. Lombardo, Shelby Township, MI (US); Jonathan K. Williams, Belleville, MI (US); Jason J. Nolte, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 863 days.

(21) Appl. No.: 12/894,553

(22) Filed: Sep. 30, 2010

(65) Prior Publication Data

US 2012/0082871 A1    Apr. 5, 2012

(51) Int. Cl.
| | | |
|---|---|---|
| *H01M 10/50* | (2006.01) | |
| *B60L 11/18* | (2006.01) | |
| *B60L 1/04* | (2006.01) | |
| *H01M 10/625* | (2014.01) | |
| *H01M 10/66* | (2014.01) | |

(52) U.S. Cl.
CPC .............. *B60L 11/187* (2013.01); *B60L 1/04* (2013.01); *B60L 11/1809* (2013.01); *H01M 10/5016* (2013.01); *H01M 10/5093* (2013.01); *Y02T 10/7005* (2013.01); *Y02T 10/705* (2013.01); *Y02T 10/7088* (2013.01); *Y02T 90/14* (2013.01); *H01M 2220/20* (2013.01)
USPC .................. 429/120; 429/61; 429/62; 62/239

(58) Field of Classification Search
USPC ......... 429/62, 120–347; 62/184, 201; 165/42, 165/104.19
See application file for complete search history.

(56) References Cited

U.S. PATENT DOCUMENTS

| | | | | |
|---|---|---|---|---|
| 6,138,466 | A * | 10/2000 | Lake et al. ....................... | 62/199 |
| 2002/0182493 | A1* | 12/2002 | Ovshinsky et al. ........... | 429/176 |
| 2002/0184908 | A1* | 12/2002 | Brotz et al. ................... | 62/259.2 |
| 2005/0167169 | A1* | 8/2005 | Gering et al. ................ | 180/65.2 |
| 2007/0298289 | A1* | 12/2007 | Clingerman et al. ........... | 429/13 |
| 2010/0212339 | A1* | 8/2010 | Kelty et al. ..................... | 62/129 |
| 2011/0302078 | A1* | 12/2011 | Failing ............................ | 705/39 |

* cited by examiner

*Primary Examiner* — Kenneth Douyette
*Assistant Examiner* — James Lee

(57) ABSTRACT

A method of operating a RESS thermal system in a vehicle having a coolant loop for directing a coolant through a RESS and a refrigerant loop configured to selectively cool the coolant flowing through a chiller in the coolant loop, including: determining a current target temperature range for the RESS based on a current vehicle operating mode and ambient temperature; determining a temperature of the RESS; determining if the temperature of the RESS needs to increase or decrease to be within the current target temperature range; if the determination is made that the temperature of the RESS needs to increase, determining if an active heating or a passive heating of the coolant will be employed, the active heating using a greater amount of energy over a shorter time period than the passive heating; and activating the determined active heating or passive heating of the coolant.

20 Claims, 5 Drawing Sheets

THERMAL MANAGEMENT CONTROLS FOR A VEHICLE HAVING A RECHARGEABLE ENERGY STORAGE SYSTEM

BACKGROUND OF INVENTION

The present invention relates generally to providing thermal management to vehicles that operate using unconventional means, such as a rechargeable energy storage system (RESS), such as a battery pack, that can be plugged-in to an electrical outlet for recharging.

For vehicles having a RESS, which may be, for example, a battery pack, the range that the vehicle can travel using the stored energy of the RESS is important. For battery packs in these vehicles, the temperature of the battery pack is a significant factor in maximizing this vehicle range. Thus, it is desirable to manage the RESS thermal system to maximize the vehicle range, while charging the RESS in an energy efficient manner as well.

SUMMARY OF INVENTION

An embodiment contemplates a method of operating a RESS thermal system in a vehicle having a coolant loop for directing coolant through a RESS and a refrigerant loop configured to selectively cool the coolant flowing through a chiller in the coolant loop, the method comprising the steps of: determining a current target temperature range for the RESS based on at least a current vehicle operating mode and ambient temperature, the target temperature range being variable based on the current vehicle operating mode and ambient temperature; determining a temperature of the RESS; determining if the temperature of the RESS needs to increase or decrease to be within the current target temperature range; if the determination is made that the temperature of the RESS needs to increase, determining if an active heating or a passive heating of the coolant will be employed, the active heating using a greater amount of energy over a shorter time period than the passive heating; and activating the determined active heating or passive heating of the coolant.

Similarly, the method may also include, if the determination is made that the temperature of the RESS needs to decrease, determining if an active cooling or a passive cooling of the coolant will be employed, the active cooling using a greater amount of energy over a shorter time period than the passive cooling; and activating the determined active or passive cooling of the coolant.

A method of operating a RESS thermal system in a vehicle having a coolant loop for directing a coolant through a RESS and a refrigerant loop configured to selectively cool the coolant flowing through a chiller in the coolant loop, the method comprising the steps of: powering down the vehicle; determining the RESS temperature at power down; determining an ambient temperature at power down; determining a time period to wait after power down to wakeup the RESS thermal system and provide RESS battery heating or cooling, if needed, based on at least the determined RESS temperature and ambient temperature at power down; waking up the RESS thermal system after the predetermined time period; and providing RESS heating or cooling, as needed, after waking up the RESS thermal system.

An advantage of an embodiment is that the thermal management of the RESS will allow for maximizing the vehicle range while charging the RESS in an energy efficient manner under different vehicle operating and charging conditions. This may also protect the life of the RESS.

DETAILED DESCRIPTION

Figure 1:
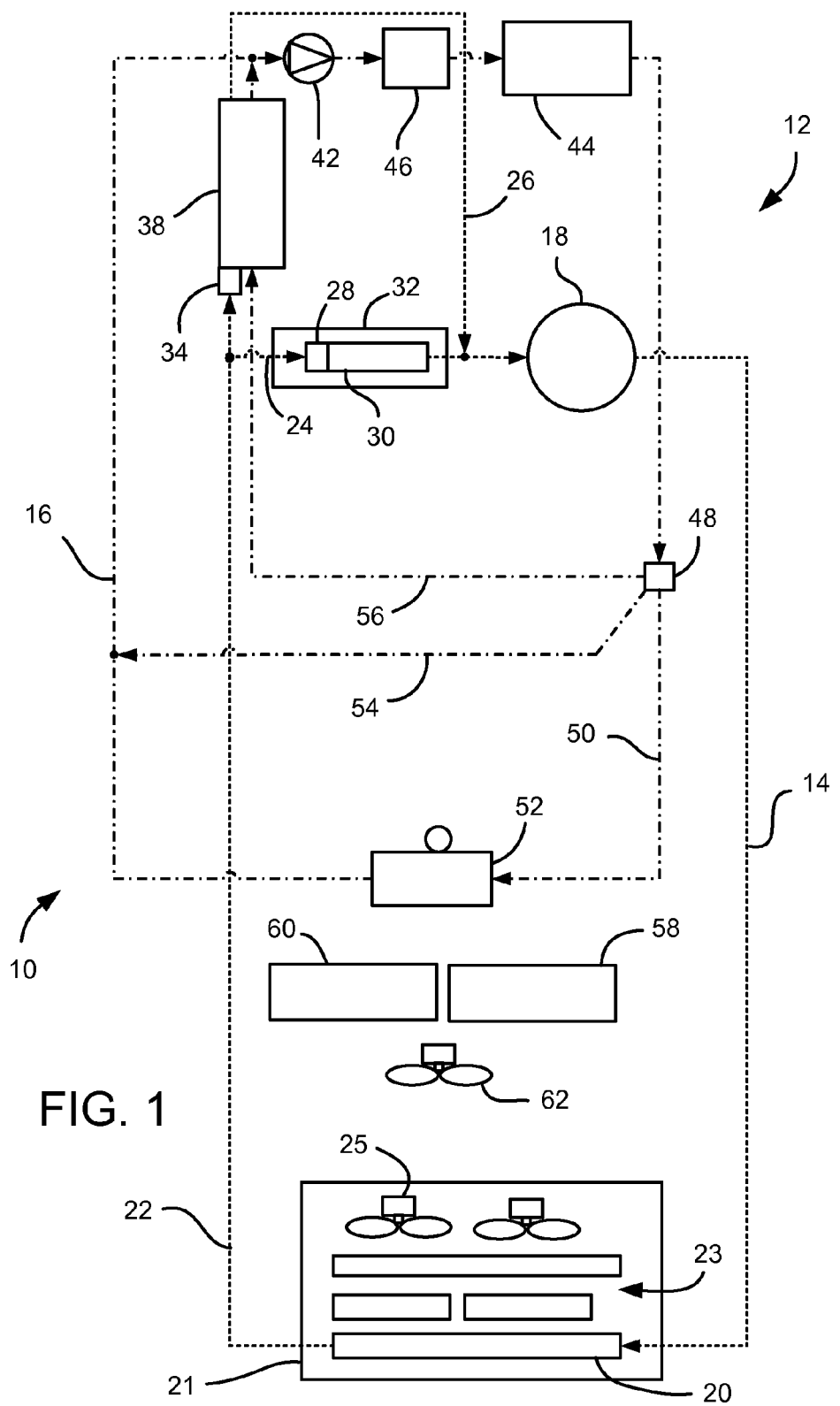
FIG. 1 is a schematic view of a RESS thermal system and a portion of a heating, ventilation and air conditioning (HVAC) system for a plug-in type of electric vehicle.

Referring to FIG. 1, a vehicle, indicated generally at 10, is shown. This vehicle 10 may be, for example, a plug-in hybrid electric vehicle or extended range electric vehicle. The vehicle 10 includes a RESS thermal system 12 that includes a refrigerant loop 14 and a coolant loop 16.

The refrigerant loop 14 includes a refrigerant compressor 18 and a condenser 20, which may be part of a condenser, radiator, fan module (CRFM) 21. The CRFM 21 may include other heat exchangers 23 and fans 25 used to cool fluids from other vehicle systems. The refrigerant compressor 18 may be electrically driven, with an ability to adjust the speed of the compressor during operation.

The condenser 20 directs refrigerant into a refrigerant line 22 that splits into a HVAC leg 24 and a chiller leg 26 of the refrigerant loop 14. The HVAC leg 24 directs the refrigerant through an expansion device 28 and into an evaporator 30, which is located in a HVAC module 32. Refrigerant exiting the evaporator may be directed back to the compressor 18.

The chiller leg 26 directs the refrigerant through an expansion device 34 and then through a chiller (refrigerant-to-coolant heat exchanger) 36. Refrigerant exiting the chiller 38 is directed back to the compressor 18.

Figure 2:
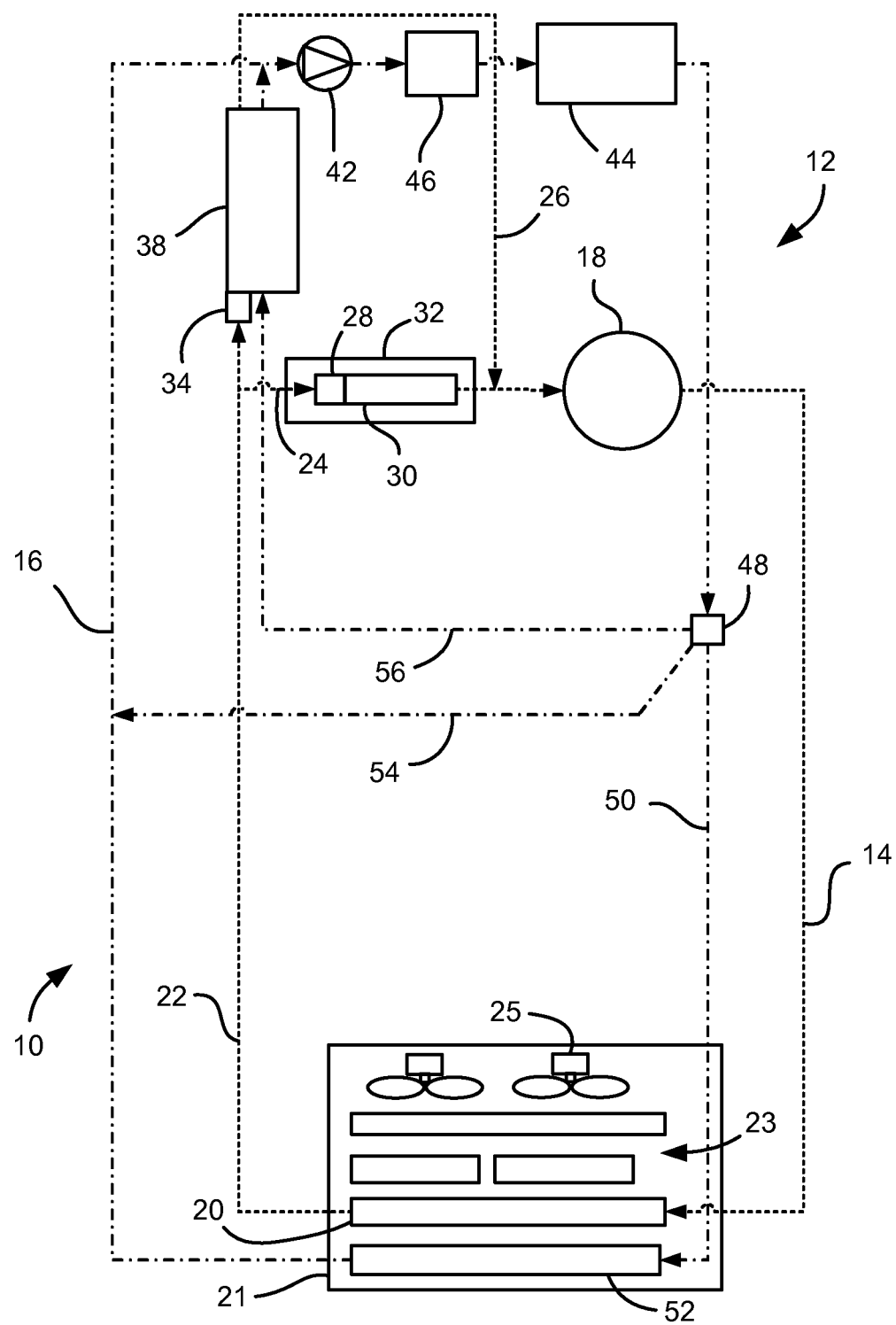
FIG. 2 is a schematic view similar to FIG. 1, but having a somewhat different component layout.

The chiller 38 is also in fluid communication with the coolant loop 16. The dashed lines in FIGS. 1 and 2 represent lines through which refrigerant flows while the dash-dot lines represent lines through which a coolant liquid flows. The coolant liquid may be a conventional liquid mixture such as an ethylene glycol and water mix, or may be some other type of liquid with suitable heat transfer characteristics.

The coolant loop 16 includes a coolant pump 42 that pumps the coolant through the loop and is controllable to vary the flow rate of the coolant flowing through the loop 16. The coolant loop 16 also includes a rechargeable energy storage system (RESS), such as a battery pack, 44 and an electric coolant heater 46. The coolant flowing through the RESS 44 is used to cool or warm the RESS as needed. The heater 46 can be activated to heat the coolant flowing through it in order to provide warming to the RESS 44.

A four port variable coolant routing valve 48 is located in the coolant loop 16 and can be selectively actuated to direct the coolant through three different branches of the coolant loop 16. A first branch 50 includes a RESS radiator 52, which is positioned to have air flowing through it. The RESS radiator 52 may be mounted near an accessory power module 58 and an RESS charger 60, which have air directed through them by a controllable fan 62. A second branch 54 forms a coolant bypass line where the coolant does not flow through the RESS radiator 52 or the chiller 38. A third branch 56 directs the coolant through the chiller 38. All three branches join together to direct the coolant back through the RESS 44.

Also, various temperature and pressure sensors and a controller (not shown) may be employed to provide input to and control the various elements of the HVAC and RESS thermal system 12.

FIG. 2 illustrates another example of a vehicle 10 and HVAC and RESS thermal system 12. This may be, for example, a plug-in hybrid electric vehicle or an extended range electric vehicle. Since this embodiment is similar to the first, similar element numbers will be used for similar elements, and the detailed description thereof will be omitted. In this embodiment, the RESS radiator 52 may be part of the CRFM 21. While the two embodiments may have somewhat different configurations, the processes, discussed below, for cooling and warming the RESS 44 may be essentially the same, if so desired.

Figure 3:
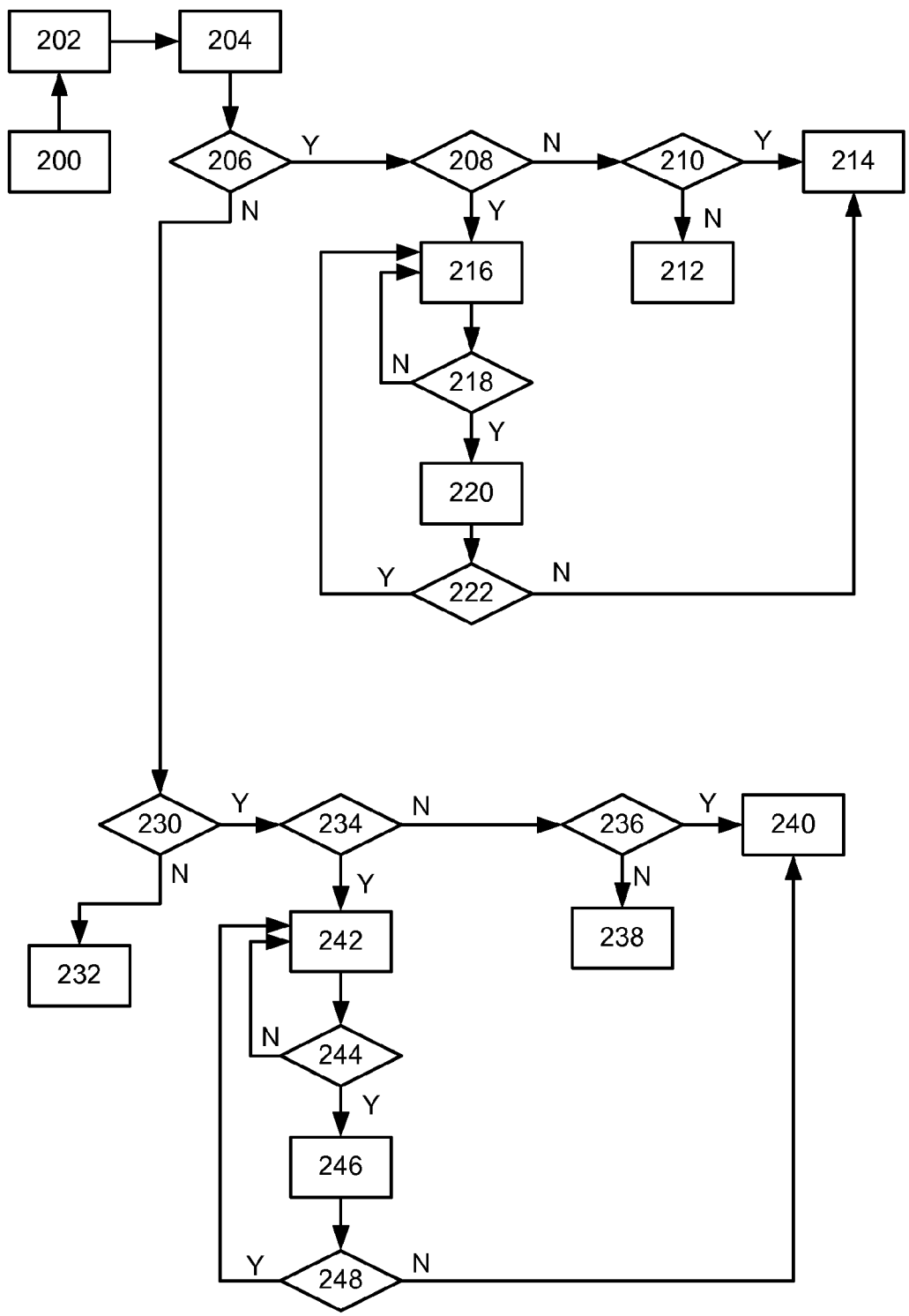
FIG. 3 is a flow chart illustrating a portion of the thermal controls for a vehicle.

FIG. 3 is a flow chart showing a portion of the thermal controls for use with a vehicle, such as, for example, those disclosed in FIGS. 1 and 2. Various inputs are received, block 200. These inputs may include, for example, cell temperatures from the RESS that allow for the determination of the maximum and minimum cell temperatures from the RESS, outside (ambient) air temperature, RESS inlet and outlet coolant temperatures, time of day, estimation of the season or time of year, engine speed, vehicle speed, front end fan speed, HVAC settings for the passenger cabin, and what operating mode the vehicle is in (e.g., the vehicle is plugged-in to a charger, in an off power mode, or the vehicle is operating). Other inputs may also be employed.

Figure 4:
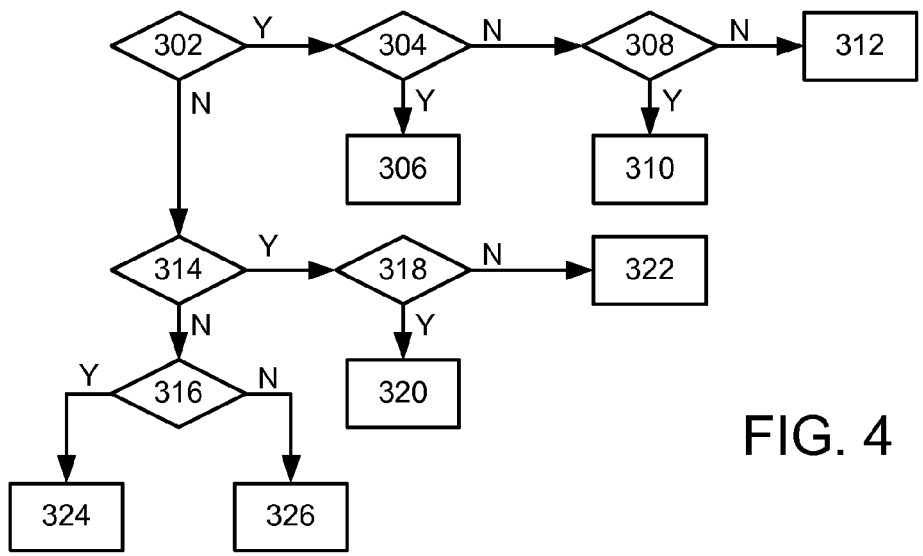
FIG. 4 is a flow chart illustrating a portion of a method for determining target temperatures for a RESS.

A target temperature range for the RESS is determined, block 202. The determination of the target temperature range will be discussed relative to FIGS. 4-7. In FIG. 4, a determination is made as to whether the vehicle is plugged-in (i.e., connected to a charging source for the RESS, such as an electric wall outlet), block 302. If it is, then a determination is made as to whether there is a delayed charge event, block 304. If there is, then a RESS protection target temperature range for a delayed charge is employed, block 306. These temperature ranges will be discussed below relative to FIGS. 5-7.

If there is not a delayed charge event, block 304, then a determination is made whether the vehicle is charging but not near charging completed or not near a vehicle departure time, block 308. If yes, then a power saver charging target temperature range is employed, block 310. If the vehicle is charging near (or at) charging completed or near a departure time, then an optimum RESS performance charge temperature range is employed, block 312.

If in block 302, the vehicle is not plugged-in, then a determination is made as to whether the vehicle is operating (i.e., being driven), block 314. If not, then a determination is made as to whether a state-of-charge of the RESS is above a predetermined threshold, block 314. If it is, then a RESS protection target temperature range is employed, block 324. If not, then active heating and cooling is disabled, block 326. If the vehicle is operating, block 314, then a determination is made as to whether the vehicle is in a charge depletion driving mode, block 318. If it is, then a charge depletion driving target temperature range is employed, block 320. If not, then a charge sustaining driving target temperature range is employed, block 322.

Figure 5:
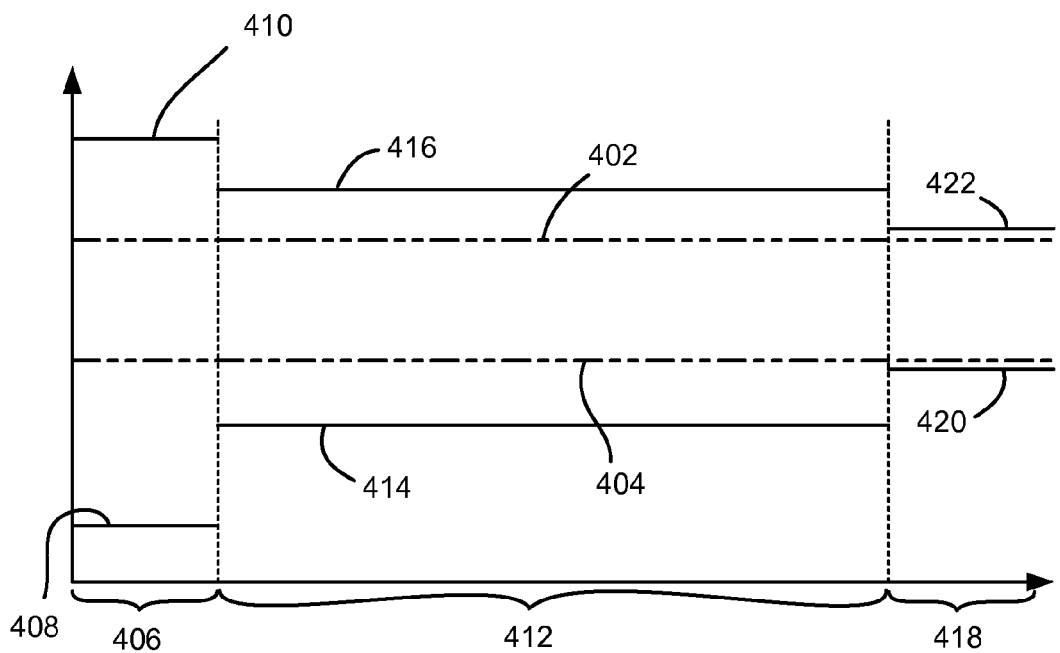
FIG. 5 is a graph illustrating target temperatures of a RESS during charging of the RESS.

FIG. 5 illustrates target temperature ranges of a RESS during an operating mode where the RESS is plugged-in and being charged. The vertical axis is temperature and the horizontal axis is time. The origin of the axes may be a plug-in event (i.e., when the charger is plugged into the vehicle and electrical outlet). The horizontal phantom lines 402, 404 indicate the upper and lower temperatures for the optimal temperature range for the RESS. The vertical dashed lines represent the changes from one charging mode to another.

The first mode 406 illustrated is a delayed charge mode, where the charger is plugged-in but the charging of the RESS is delayed until a more preferred time. This mode corresponds to block 306 in FIG. 4. If the temperature of the RESS is below the lowest recommended temperature 408, then active heating of the RESS is enabled, and if the temperature of the RESS is above the highest recommended temperature 410, then active cooling of the RESS is enabled. Below and above these temperature limits 408, 410, passive heating or cooling, as the case may be, may still be tried first, if available. But if not effective enough, then active heating or cooling will be employed.

The second mode 412 illustrated is a vehicle charging event where the charging is not near charge completion or a vehicle departure time. This mode corresponds to block 310 in FIG. 4. If the temperature of the RESS is below the lowest recommended temperature 414, then active heating of the RESS is enabled, and if the temperature of the RESS is above the highest recommended temperature 416, then active cooling of the RESS is enabled. Below and above these temperature limits 414, 416, passive heating or cooling, as the case may be, may still be tried first, if available. But if not effective enough, then active heating or cooling will be employed.

The third mode 418 illustrated is a vehicle charging event where the charging is near (or at) charge completion or a vehicle departure time. This mode corresponds to block 312 in FIG. 4. If the temperature of the RESS is below the lowest recommended temperature 420, then active heating of the RESS is enabled, and if the temperature of the RESS is above the highest recommended temperature 422, then active cooling of the RESS is enabled. As discussed above, passive heating or cooling may be tried first, if available, before employing the active heating or cooling. Charge completion is when the RESS is fully charged. A vehicle departure time may be a time of day when the vehicle is typically unplugged from the charger and driven. This time of day may be programmed-in by a user or estimated based upon historical use times for the particular vehicle, if so desired.

One will note that the temperature thresholds for the three different modes 406, 412 and 418 are different. When in the delayed charging mode 406, the RESS temperature is allowed to stray farther from the optimal RESS temperature range—it is undesirable to drain the RESS more than is necessary in an attempt to maintain the RESS temperature, and the effectiveness of charging the RESS is not a factor when no charging is taking place. Thus, the lowest allowable temperature 408 is lower than the two other modes and the highest allowable temperature 410 is higher than for the two other modes.

For the third mode 318, when the RESS is close to being fully charged, the maximum charge may be better stored in the RESS as it is closer to the optimal RESS temperature range, and in addition, the RESS is already close to maximum range on a charge, so a more aggressive maintenance of the temperature range may be advantageous even though more energy is used by the vehicle to maintain this more aggressive temperature range. If the vehicle may be about to begin operation, it may be more advantageous for the RESS to be closer to the optimal RESS temperature range, which may justify the more aggressive RESS temperature targets.

Figure 6:
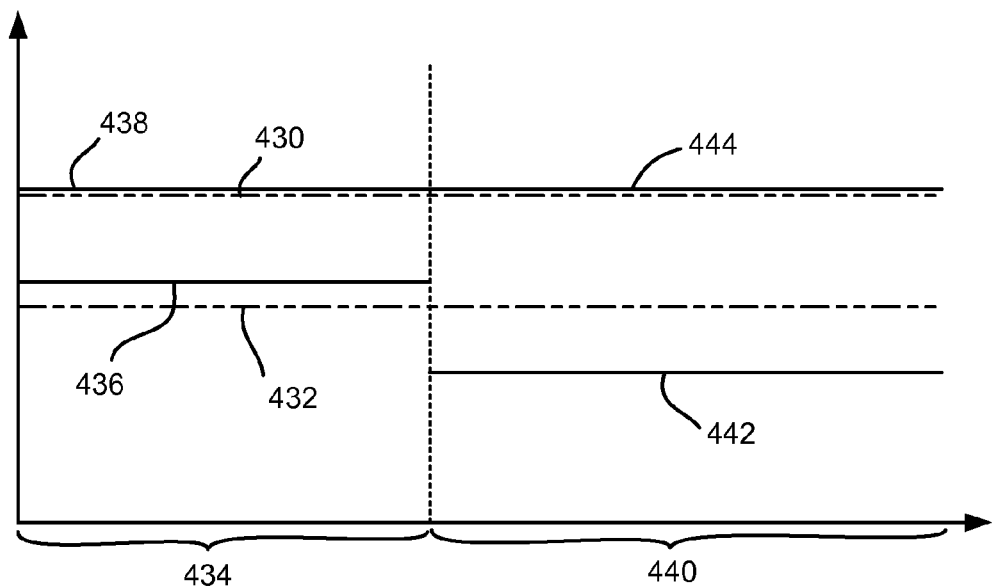
FIG. 6 is a graph illustrating target temperatures of the RESS under different vehicle driving conditions.

FIG. 6 illustrates target temperature ranges of a RESS during operation of the vehicle (e.g., driving the vehicle on a road). The vertical axis is temperature and the horizontal axis is time. The origin of the axes may be a start of a vehicle driving event. The horizontal phantom lines 430, 432 indicate the upper and lower temperatures for the optimal temperature range for the RESS. The vertical dashed line represents the change from one driving mode to another.

The first mode 434 illustrated is a charge depletion driving mode, where the vehicle is operating by, at least in part, draining energy from the RESS. This mode corresponds to block 320 in FIG. 4. If the temperature of the RESS is below the lowest recommended temperature 436, then active heating of the RESS is enabled, and if the temperature of the RESS is above the highest recommended temperature 438, then active cooling of the RESS is enabled. As discussed above, passive heating or cooling may be tried first, if available, before employing the active heating or cooling.

The second mode 440 illustrated is a charge sustaining driving mode, where the vehicle is operating but generally at least maintaining the energy stored in the RESS. This mode corresponds to block 322 in FIG. 4. If the temperature of the RESS is below the lowest recommended temperature 442, then active heating of the RESS is enabled, and if the temperature of the RESS is above the highest recommended temperature 444, then active cooling of the RESS is enabled. Again, the temperature ranges maintained are different based on the mode of operation of the vehicle.

Figure 7:
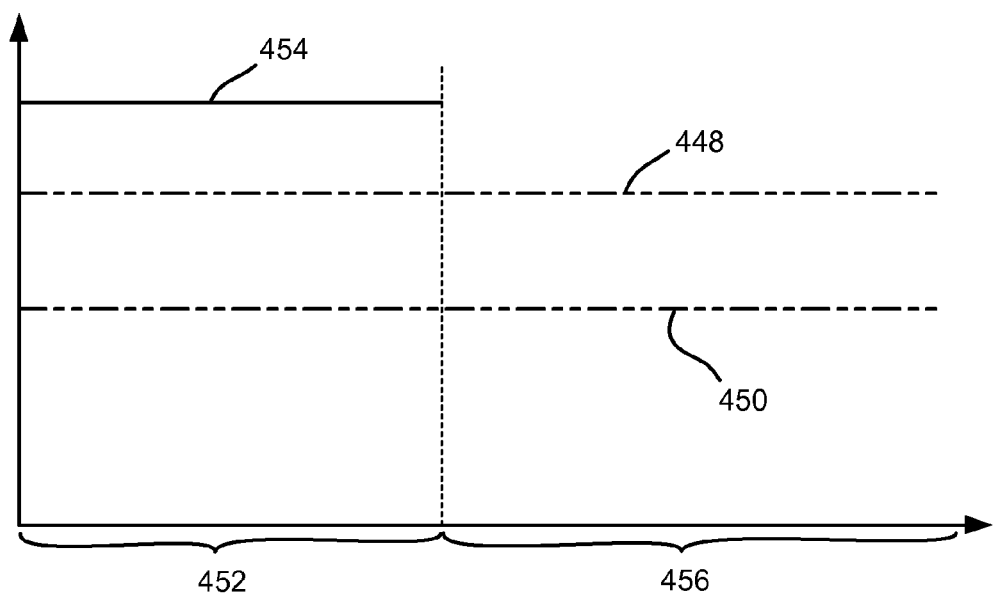
FIG. 7 is a graph illustrating target temperatures of the RESS in a vehicle off mode when the vehicle is not plugged-in to a charger.

FIG. 7 illustrates target temperature ranges of a RESS during operation of the vehicle (e.g., driving the vehicle on a road). The vertical axis is temperature and the horizontal axis is time. The origin of the axes may be when the vehicle ceases operation and is not plugged-in for recharging (e.g., when a vehicle is parked in a parking lot without any charging hook-ups available)—an off power mode. The horizontal phantom lines 448, 450 indicate the upper and lower temperatures for the optimal temperature range for the RESS. The vertical dashed line represents the change from one off power mode to another off power mode.

The first mode 452 illustrated is an off power mode where the state of charge of the RESS is above a predetermined threshold. This mode corresponds to block 324 in FIG. 4. If the temperature of the RESS is above the highest recommended temperature 454, then active cooling of the RESS is enabled. Active heating is not employed.

The second mode 456 illustrated is an off power mode where the state of charge of the RESS is below the predetermined threshold. This mode corresponds to block 326 in FIG. 4. Active or passive heating or cooling is not employed to avoid draining the RESS.

For the target temperature ranges in FIGS. 5-7, adjustments may be made to the temperature ranges based on the ambient temperature, the time of day and also possibly on the season (time of the year). For example, if the time of day is late evening, where the temperature will naturally cool overnight, the high temperature threshold for active cooling may be raised by a predetermined amount. This amount may be varied based on the particular season. The season may be determined, for example, by electronics set by user inputs or may be predicted based on measured ambient air temperatures measured over a predetermined time period. Also, the current ambient temperature may be used to adjust the temperature ranges since this temperature can affect the effectiveness of the thermal system in its heating and cooling operations. For example, the RESS radiator is more effective at cooling the coolant if the temperature of the ambient air being pulled through it is five degrees Celsius than if the ambient air temperature is twenty five degrees Celsius.

Referring again to FIG. 3, once the desired inputs are known, block 200, and the target temperature range is determined, block 202, a determination is made as to whether the coolant temperature in the coolant loop needs to increase, decrease or stay the same, block 204. The coolant temperature, of course, affects the RESS temperature by absorbing heat from or giving off heat to the RESS as the coolant flows through it. How much thermal energy needs to be added or removed from the RESS and the current coolant temperature can be used to determine how much heat needs to be added to the coolant to reach the coolant temperature desired for thermally conditioning the RESS. The particular means by which the HVAC and RESS thermal system will heat or cool the RESS is now determined.

A determination is made as to whether the RESS temperature is too high, block 206, and if so a determination is made as to whether passive cooling is desired, block 208. If not, then a determination is made as to whether active cooling is desired, block 210. If not, then the coolant routing valve is set to direct coolant through the bypass branch, block 212. In this situation, the coolant pump may also operate during RESS charging or vehicle operation to create coolant flow through the RESS. For the different modes of operation discussed herein, the speed of the coolant pump may be varied to obtain the instantaneous desired flow rate of the coolant through the RESS. This may vary based on the particular heating or cooling mode being used, as well as other vehicle and RESS conditions. Moreover, the speed of the coolant pump may be varied to allow for other vehicle systems to mask the noise, vibration and harshness (NVH) characteristics of the pump, or to skip resonant speeds of the pump.

If, on the other hand, active cooling is desired, the active cooling commences, block 214. This may involve activating the refrigerant compressor, moving the coolant routing valve to direct the coolant through the chiller, and activating the coolant pump to pump the coolant through the RESS. The refrigerant flowing through the chiller will absorb heat from the coolant flowing through the chiller, with the chilled coolant flowing through the RESS to cool it. If less than maximum cooling is needed, the routing valve may be moved to a position where a portion of the coolant flows through the bypass branch, or the operation of the compressor may be changed to reduce the cooling affect of the refrigerant. The desired coolant temperature, current coolant temperature and ambient temperature may be used as factors in determining control of the compressor operation. If a high cooling load is needed for the vehicle passenger compartment, then adjustments may be made to maintain adequate cooling in the passenger compartment, such as routing a portion of the coolant flow through the bypass branch.

If passive cooling is desired and available, block 208, then passive cooling is started, block 216. For passive cooling, the coolant routing valve directs the coolant through the RESS radiator, the fans can be used to draw air through the CRFM, and the coolant pump is activated to pump coolant through the RESS. While the passive cooling mode, in general, does not cool the coolant flowing into the RESS as quickly as the active cooling mode, the passive cooling mode has a much lower rate of energy usage than the active cooling since the refrigerant compressor is not employed to cool refrigerant for the chiller.

Feedback may also be used in this method to assure that the thermal changes are occurring as desired. So, after passive cooling is started, block 216, a check may be made to determine if active cooling is available (based on energy usage and vehicle operating conditions), block 218. If not, then passive cooling is continued. If it is, then the passive cooling performance is monitored, block 220. The rate of RESS temperature change over time may be monitored and compared with the desired cooling performance. A check is made to determine if the passive cooling performance is being met, block 222. If so, passive cooling continues, block 216. If not, then active cooling may be initiated, block 214.

In addition, if so desired, checks to assure that active cooling is occurring as desired may also be employed. This may occur when a fault has been detected in the cooling system. A check may be made between the inlet and outlet temperature of the coolant flowing through the chiller in order to assure that heat is being rejected to the refrigerant. If the temperature difference is less than a predetermined minimum, then passive cooling may be employed, if available, or no cooling will be employed.

If the temperature is not too high, block 206, then a determination is made whether the RESS temperature is too low, block 230. If not, then no RESS heating or cooling is required, block 232. The coolant routing valve may be set to direct coolant through the bypass branch and the pump may be activated for the purpose of making sure the RESS temperature remains relatively even throughout the RESS.

If the RESS temperature is too low, then a determination is made as to whether passive heating is desired and available, block 234. If not, then a determination is made as to whether active heating is desired, block 236. If not, then the coolant routing valve is set to direct coolant through the bypass branch, block 238. In this situation, the coolant pump may also operate during RESS charging or vehicle operation to create coolant flow through the RESS.

If, on the other hand, active heating is desired, the active heating commences, block 240. This may involve activating the electric coolant heater and the coolant pump. The coolant routing valve directs the coolant through the bypass branch. The coolant flowing through the coolant heater will absorb heat and then flow through and warm the RESS. The electric heater may be controlled to make sure it operates within an acceptable limit based on other electric needs of the vehicle at that time.

If passive heating is desired and available, block 234, then passive heating is started, block 242. For passive heating, the coolant routing valve directs the coolant through the RESS radiator, the fans can be used to control the air flow through the CRFM, and the coolant pump is activated to pump coolant through the RESS. While the passive heating mode, in general, does not warm the coolant flowing into the RESS as quickly as the active heating mode, the passive heating mode has a lower rate of energy usage than the active heating since the coolant heater is not employed to heat the refrigerant.

For both passive heating and passive cooling the ability of the RESS radiator to heat or cool the coolant flowing through it may affect whether these passive means of heating or cooling are available at the particular time that heating or cooling of the RESS is needed. Thus, when not available, active heating or cooling may be employed if desired.

Feedback may be used to assure that the thermal changes are occurring as desired. So, after passive heating is started, block 242, a check may be made to determine if active heating is available (based on energy usage and vehicle operating conditions), block 244. If not, then passive heating is continued. If it is, then the passive heating performance is monitored, block 246. The rate of RESS temperature change over time may be monitored and compared with the desired heating performance. A check is made to determine if the passive heating performance is being met, block 248. If so, passive heating continues, block 242. If not, then active heating is initiated, block 240.

The thermal management controls for the vehicle may include a wakeup function to thermally condition the RESS, if needed, when the vehicle is off, whether plugged-in and charging or unplugged (off power mode). The elapsed time before a wakeup event occurs may be based on the then current RESS temperature and ambient temperature when the vehicle goes to sleep (i.e., the vehicle powers down because it is no longer in an operating mode). The time of day may also be a factor in determining the time to wait before the wakeup event occurs. Also, the wakeup function may be canceled or reset when vehicle start, charging initiation or wake up and thermal conditioning initiation begins. The purpose of setting the time is to predict when the RESS may have exceeded its allowed temperature range due to ambient and other conditions, and then wake up the vehicle systems enough to thermally condition the RESS to get the temperature of the RESS back into a desired range.

The target temperature ranges discussed in FIGS. 5 and 7 may be employed during the wakeup function operation. At wakeup, the determinations are made as to whether RESS thermal conditioning is needed. If it is, then the coolant is thermally conditioned while being pumped through the RESS in order to return the RESS temperature to the desired range. After a wakeup event, the thermal conditioning components are again shut down and a new wakeup time may be set based on the updated RESS temperature and ambient temperature at the end of the wakeup event.

While certain embodiments of the present invention have been described in detail, those familiar with the art to which this invention relates will recognize various alternative designs and embodiments for practicing the invention as defined by the following claims.

What is claimed is:

1. A method of operating a RESS thermal system in a vehicle having a coolant loop for directing a coolant through a RESS and a refrigerant loop configured to selectively cool the coolant flowing through a chiller in the coolant loop, the method comprising the steps of:
   (a) determining a current target temperature range for the RESS based on at least a current vehicle operating mode and ambient temperature, the target temperature range being variable based on the current vehicle operating mode and ambient temperature;
   (b) determining a temperature of the RESS;
   (c) determining if the temperature of the RESS needs to increase or decrease to be within the current target temperature range;
   (d) if the determination is made that the temperature of the RESS needs to increase, determining if an active heating or a passive heating of the coolant will be employed, the active heating using a greater amount of energy over a shorter time period than the passive heating; and
   (e) activating the determined active heating or passive heating of the coolant from step (d).

2. The method of claim 1 further comprising:
   (f) if the determination is made that the temperature of the RESS needs to decrease, determining if an active cooling or a passive cooling of the coolant will be employed, the active cooling using a greater amount of energy over a shorter time period than the passive heating; and
   (g) activating the determined active cooling or passive cooling of the coolant from step (f).

3. The method of claim 2 wherein steps (f) and (g) are further defined by the active cooling including operating a refrigerant compressor and directing cooled refrigerant through the chiller through which the coolant is directed, and the passive cooling includes directing the coolant through a RESS radiator and directing airflow through the RESS radiator to absorb heat from the coolant.

4. The method of claim 2 wherein, if the passive cooling is activated in step (g), monitoring the rate of change of the coolant temperature and switching from the passive cooling to the active cooling if the rate of change of the coolant is below a predetermined threshold.

5. The method of claim 1 wherein step (d) and (e) are further defined by the active heating including operating an electric coolant heater to heat the coolant just prior to flowing through the RESS, and the passive heating includes directing the coolant through a RESS radiator and directing airflow through the RESS radiator to add heat to the coolant.

6. The method of claim 1 wherein step (a) is further defined by adjusting the current temperature range based on the time of day at which the target temperature range is being determined.

7. The method of claim 1 wherein step (a) is further defined by the current vehicle operating mode comprising one of a delayed charging mode, a vehicle charging mode and a charge complete mode, and wherein the current target temperature range is different for each of the modes.

8. The method of claim 1 wherein step (a) is further defined by the current vehicle operating mode comprising one of a charge depletion driving mode and a charge sustaining driving mode, and wherein the current target temperature range is different for each of the modes.

9. The method of claim 1 wherein, if the passive heating is activated in step (e), monitoring the rate of change of the coolant temperature and switching from the passive heating to the active heating if the rate of change of the coolant is below a predetermined threshold.

10. The method of claim 1 further comprising:
(f) powering down the vehicle;
(g) determining the RESS temperature at power down;
(h) determining an ambient temperature at power down;
(i) determining a time period to wait after power down to wakeup the RESS thermal system and provide RESS battery heating or cooling, if needed, based on at least the determined RESS temperature and ambient temperature at power down; and
(j) waking up the RESS thermal system after the predetermined time period.

11. The method of claim 10 further comprising (k) determining a time of day at power down; and wherein step (i) is further defined by determining the time period to wait after power down based on at least the determined RESS temperature, ambient temperature and time of day at power down.

12. The method of claim 10 further comprising:
(k) determining a RESS temperature and an ambient temperature at an end of the wake up in step (j); and
(l) determining a time period to wait after the end of the wake up to again wake up the RESS thermal system and provide RESS battery heating or cooling, if needed.

13. A method of operating a RESS thermal system in a vehicle having a coolant loop for directing a coolant through a RESS and a refrigerant loop configured to selectively cool the coolant flowing through a chiller in the coolant loop, the method comprising the steps of:

(a) powering down the vehicle;
(b) determining the RESS temperature at power down;
(c) determining an ambient temperature at power down;
(d) determining a time period to wait after power down to wakeup the RESS thermal system and provide RESS battery heating or cooling, if needed, based on at least the determined RESS temperature and ambient temperature at power down;
(e) waking up the RESS thermal system after the predetermined time period; and
(f) providing RESS heating or cooling, as needed, after waking up the RESS thermal system.

14. The method of claim 13 further comprising (g) determining a time of day at power down; and wherein step (d) is further defined by determining the time period to wait after power down based on at least the determined RESS temperature, ambient temperature and time of day at power down.

15. The method of claim 13 further comprising:
(g) determining a RESS temperature and an ambient temperature at an end of the wake up in step (f); and
(h) determining a time period to wait after the end of the wake up to again wake up the RESS thermal system and provide RESS battery heating or cooling, if needed.

16. The method of claim 13 further comprising:
(g) determining a current target temperature range for the RESS based on at least a current vehicle operating mode and ambient temperature, the target temperature range being variable based on the current vehicle operating mode and ambient temperature;
(h) determining a temperature of the RESS;
(i) determining if the temperature of the RESS needs to increase or decrease to be within the current target temperature range;
(j) if the determination is made that the temperature of the RESS needs to decrease, determining if an active cooling or a passive cooling of the coolant will be employed, the active cooling using a greater amount of energy over a shorter time period than the passive cooling; and
(k) activating the determined active cooling or passive cooling of the coolant from step (j).

17. The method of claim 16 wherein steps (j) and (k) are further defined by the active cooling including operating a refrigerant compressor and directing cooled refrigerant through the chiller through which the coolant is directed, and the passive cooling includes directing the coolant through a RESS radiator and directing airflow through the RESS radiator to absorb heat from the coolant.

18. The method of claim 17 wherein, if the passive cooling is activated in step (k), monitoring the rate of change of the coolant temperature and switching from the passive cooling to the active cooling if the rate of change of the coolant is below a predetermined threshold.

19. The method of claim 16 wherein step (g) is further defined by adjusting the current temperature range based on the time of day at which the target temperature range is being determined.

20. The method of claim 16 wherein step (g) is further defined by the current vehicle operating mode comprising one of a delayed charging mode, a vehicle charging mode and a charge complete mode, and wherein the current target temperature range is different for each of the modes.

* * * * *